United States Patent [19]

Hamilton

[11] 4,284,610

[45] * Aug. 18, 1981

[54] BN BONDED BN FIBER ARTICLE AND METHOD OF MANUFACTURE

[75] Inventor: Robert S. Hamilton, Youngstown, N.Y.

[73] Assignee: Kennecott Corporation, Stamford, Conn.

[ * ] Notice: The portion of the term of this patent subsequent to Dec. 19, 1995, has been disclaimed.

[21] Appl. No.: 22,251

[22] Filed: Mar. 20, 1979

Related U.S. Application Data

[63] Continuation-in-part of Ser. No. 968,070, Dec. 11, 1978, abandoned, and Ser. No. 913,916, Jun. 8, 1978, abandoned, each is a continuation of Ser. No. 773,588, Mar. 2, 1977, Pat. No. 4,130,631, and Ser. No. 773,587, Mar. 2, 1977, abandoned.

[51] Int. Cl.$^3$ .......................... C01B 35/08; H01M 8/02
[52] U.S. Cl. ...................................... 423/290; 106/55; 429/102; 429/136; 429/212
[58] Field of Search ................. 423/290; 106/39.5, 55; 429/102, 212, 136

[56] References Cited

U.S. PATENT DOCUMENTS

| | | | |
|---|---|---|---|
| 2,888,325 | 5/1959 | Taylor | 423/290 |
| 3,837,997 | 9/1974 | Economy et al. | 423/290 |
| 3,915,742 | 10/1975 | Battles et al. | 429/102 |
| 4,130,631 | 12/1978 | Hamilton | 423/290 |

*Primary Examiner*—G. O. Peters
*Attorney, Agent, or Firm*—William H. Holt; Raymond W. Green; Michael L. Dunn

[57] ABSTRACT

A boron nitride bonded boron nitride fiber article and the method for its manufacture which comprises forming a shaped article with a composition comprising a bonding compound selected from boron oxide and boric acid and a structural fiber selected from the group consisting of boron oxide, boron nitride and partially nitrided boron oxide fibers, heating the composition in an anhydrous gas to a temperature above the melting point of the compound and nitriding the resulting article in ammonia gas.

28 Claims, 7 Drawing Figures

BN BONDED BN FIBER ARTICLE AND METHOD OF MANUFACTURE

The invention described herein was made in the course of, or under, a sub-contract under a contract with the U.S. Atomic Energy Commission.

CROSS REFERENCES TO RELATED APPLICATIONS

This is a continuation-in-part of U.S. patent application Ser. No. 968,070, filed Dec. 11, 1978, now abandoned; and of U.S. patent application Ser. No. 913,916 filed June 8, 1978, also now abandoned. Applications Ser. No. 968,070 and Ser. No. 913,916 are, respectively, continuations of U.S. patent applications Ser. No. 773,588, filed Mar. 2, 1977, now U.S. Pat. No. 4,130,631, and Ser. No. 773,587, filed Mar. 2, 1977, now abandoned.

BACKGROUND OF THE INVENTION

(a) Field of the Invention

This invention relates to boron nitride fibers and more particularly relates to articles manufactured from integral three dimensional boron nitride fiber mats. The invention further relates to the method for the manufacture of such articles.

(b) History of the Prior Art

Boron nitride (BN) possesses a number of highly desirable properties which render it useful in a wide variety of applications. Its high electrical resistivity coupled with its high thermal conductivity make it especially useful in electrical and electronic applications requiring a material which simultaneously acts as an electrical insulator and a thermal conductor. Its excellent thermal shock resistance renders it effective as a refractory at temperatures up to 1,600° C. or higher in a non-oxidizing atmosphere and at temperatures as high as 700° to 900° C. in air. It is highly corrosion resistant, being inert to most organic liquids and many corrosive chemicals and displaying excellent resistant to attack by various molten metals. Furthermore, because of its low dissipation factor over a wide temperature range, this material is well suited for use in microwave and radar dielectric components (radar windows). Various methods for the manufacture of boron nitride fibers are known in the prior art, for example, it is disclosed in U.S. Pat. No. 3,429,722, issued to James Economy et al, that boron nitride fibers can be manufactured by heating boron oxide fibers in an ammonia atmosphere.

U.S. Pat. No. 3,668,059 issued to James Economy et al discloses a boron nitride fiber having a high Young's modulus of elasticity which is prepared by heating a partially nitrided fiber in an inert atmosphere at a temperature of at least 1800° C. under longitudinal tension.

While it is well known in the prior art that boron nitride fibers can be manufactured having good characteristics, the use of such fibers has been limited due to difficulties in forming three dimensional articles from the fibers. Almost any substance which is used to bond the fibers to each other has properties which are inferior to the properties of the boron nitride fibers thus resulting in a bonded article which is unsuitable for use in many applications. For example, when a boron nitride fiber article, which is bound by prior art materials, is used as a separator material in a corrosive cell electrolyte such as molten lithium chloride and potassium chloride, the fibers separate from each other due to the inability of the binding material to withstand the high temperature corrosive environment.

An attempt has been made prior to the present invention to form articles from boron nitride bonded boron nitride fibers by heating boron nitride fibers impregnated with boric acid solution to elevated temperatures in ammonia as disclosed in U.S. Pat. No. 3,837,997 to James Economy et al.

In addition to the above-noted references relating to boron nitride fibers, shaped boron nitride, usually non-porous, bodies have also been prepared in the past. Such articles are disclosed, for example, by Taylor, U.S. Pat. No. 2,888,325, which teaches the use of a multiple stage nitriding process comprising intermittant addition of oxygen-containing boron compound at intermediate stages of nitriding, followed by further nitriding.

Furthermore, such articles have been prepared by sintering boron nitride fibers in the presence of boron oxide.

None of these methods resulted in a non-woven porous boron nitride fiber article having sufficient strength for use as an electric cell separator in molten lithium chloride environments. These bonding processes sometimes resulted in a boron nitride fiber of reduced strength or the bond was of insufficient strength or durability to secure the fibers to each other in molten lithium chloride environments.

BRIEF DESCRIPTION OF THE INVENTION

In accordance with this invention, there is now provided an article comprising fused boron nitride fibers, which retains the porous characteristics of a fiber mat and in addition has good dimensional strength, is relatively non-brittle, i.e., flexible, when compared with prior art boron nitride fiber articles and retains the high heat and chemical resistance of boron nitride fiber.

In accordance with this invention, the boron nitride article is manufactured by a method which comprises blending from about 0.5 to about 40 weight percent of a bonding compound selected from the group consisting of boron oxide and boric acid with from about 60 to about 99.5 weight percent of a structural fiber manufactured from boron oxide, partially nitrided boron oxide or boron nitride or mixtures of such fibers. The compound and fibers are mixed in an anhydrous fluid vehicle in which the compound and the fiber are insoluble. The compound always has a lower melting point than the melting or decomposition temperature of the structural fibers. The compound may be in any suitable form such as a powder or small diameter fibers having a diameter similar to the diameter of the structural fibers.

After the compound and the fibers are blended together, a shaped article is formed with the resulting blend and sufficient fluid vehicle is removed from the blend to permit intimate contact of the fiber with the compound.

After the article is formed, it is heated in an anhydrous gas selected from the group consisting of inert gases, nitrogen, ammonia and mixtures thereof to a temperature above the melting temperature of the compound and below the melting or decomposition temperature of the structural fibers for a time sufficient to melt at least some of the bonding compound to the fibers.

The article is then heated in an ammonia atmosphere to a sufficient temperature for a sufficient time to convert essentially all of the compound and fibers to boron nitride. Heating to melt bonding compound and heating to convert to boron nitride may occur simultaneously.

The resulting article comprises boron nitride fibers fused to each other with boron nitride which article has good strength, good dimensional stability, good chemical resistance, relatively good flexibility and retains the desirable characteristics, i.e., porosity, of a fiber article.

DETAILED DESCRIPTION OF THE INVENTION

Figure 1:
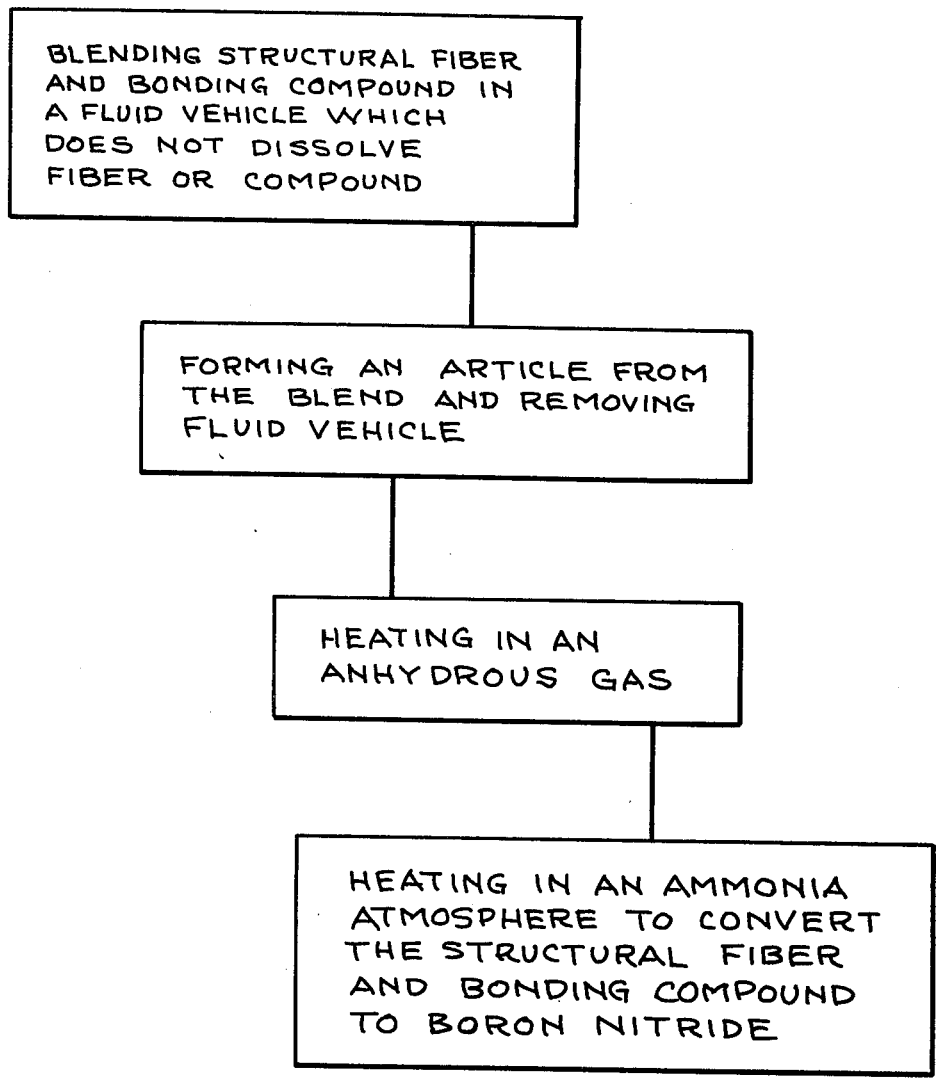
FIG. 1 is a flow diagram illustrating the process of the invention.

The article, manufactured in accordance with the method of the invention, can be of any desirable shape. For example, the article may be irregular, spherical, cubic, cylindrical, oval, a bar or in the form of a plate or mat. The article may be provided with holes or contours if desired for a particular application. The article is believed to comprise a body of boron nitride fibers which are secured to each other at fiber intersections by partially or completely nitrided boron oxide. Desirably, the boron oxide is completely nitrided to form boron nitride.

One example of a desirable article manufactured in accordance with the process of the invention, is a fiber mat which has sufficient porosity, strength, and chemical resistance to be used as a separator in lithium-sulfide batteries utilizing molten lithium chloride and molten potassium chloride as the electrolyte.

In accordance with the method of the invention, from about 0.5 to about 40 weight percent, preferably from about 2 to about 40 weight percent and most preferably from about 5 to about 30 weight percent of a bonding compound selected from the group consisting of boron oxide and boric acid is blended with from about 60 to about 99.5 weight percent, preferably from about 70 to about 98 weight percent and most preferably from about 80 to about 95 weight percent of fiber manufactured from boron oxide, partially nitrided boron oxide or boron nitride or mixtures of such fibers. The most desirable concentration of bonding compound, i.e., boron oxide, boric acid and mixtures thereof, whether in powder, crystal or fiber form, is from about 10 to about 20 weight percent and the most desirable concentration of structural fiber is from about 80 to about 90 weight percent.

As previously discussed, the bonding compound may be particulate or, in the case of boron oxide, fibers may be used. When the boron oxide is in the form of fibers, the boron oxide ($B_2O_3$) fibers desirably have a maximum diameter of 20 microns and most desirably, a maximum diameter of about 10 microns. The minimum diameter is usually determined by manufacturing techniques but is almost always greater than 0.1 micron. When the boron oxide or boric acid is particulate, the average particle size may vary from sub-micron to about 100 microns in diameter and the particles may be of any shape. When the compound is boric acid, the particles are usually in the form of crystals. The structural fibers, used in accordance with the invention, as previously discussed, are boron oxide, boron nitride or partially nitrided boron oxide fibers which have a maximum diameter of 30 microns, more desirably a maximum diameter of 20 microns and most desirably, a maximum diameter of about 10 microns. The minimum diameter of the structural fiber is usually determined by manufacturing techniques but is almost always greater than 0.1 micron.

The boron nitride or partially nitrided boron oxide fibers are desirably made by heating boron oxide fibers in an ammonia atmosphere in accordance with known procedures as for example, are disclosed in U.S. Pat. Nos. 3,429,722 and 3,668,059 both issued to James Economy. Boron oxide fibers, when used, may be made by any known method including spinning the $B_2O_3$ fibers from a $B_2O_3$ melt, drawing the fibers upon a reel and blowing the fibers in staple form from a $B_2O_3$ melt. The $B_2O_3$ fibers, during manufacture and subsequent thereto, are usually protected from moist or wet environments.

The bonding compound and the structural fibers are blended together in a fluid vehicle which will dissolve neither the bonding compound nor the structural fiber. Dissolve, as used herein, means that at least ten percent of either the bonding compound or structural fiber will enter into solution with the fluid vehicle within the time required to manufacture the article. The fluid may be a gaseous fluid such as air or nitrogen or a liquid fluid such as halogenated and non-halogenated hydrocarbons and monohydroxy alcohols having three or more carbon atoms. A particularly suitable vehicle is kerosene. Examples of other suitable liquid vehicles are hexane and fluorinated hydrocarbons. Liquid, low boiling, fluorinated hydrocarbons are particularly desirable.

The compound may be blended with the fibers by any suitable means such as by slurrying the fibers in a fluid vehicle such as kerosene. Other methods for blending the bonding compound with the structural fibers include blowing the structural fibers and the bonding compound, whether in fiber or particle form, into a container or mixing the compound and the structural fibers in a fluidized bed. A shaped article is then formed with the resulting blend by any suitable means. For example, the shaped article may be formed by pressing the blend into the appropriate shape. Molds may be used if desired during the pressing procedure. Articles such as fiber mats and fiber boards can be manufactured by pressing the blend, e.g., between flat plates. Pressures which can be used to press the article during the forming procedure preferably range between about 0.5 and about 2.5 kilograms per square centimeter gauge. The shaped articles can also be formed from the blend by casting a slurry of the blend in a liquid vehicle followed by subsequent draining or evaporation of the liquid. The slurry may be cast into a mold or onto a flat surface.

Sufficient vehicle is removed from the blend to permit forming and to permit intimate contact of the structural fiber with the bonding compound. In the case of gaseous fluid vehicle, insufficient differential pressure is maintained to permit the compound or the structural fibers to remain suspended in the fluid vehicle and in the case of a liquid vehicle, sufficient liquid is removed by draining or evaporation to permit enough contact between structural fibers and compound to form bonding sites after appropriate heating. In general, the fluid vehicle is either essentially anhydrous, gas or liquid since water is a solvent for boric acid or boron oxide. In the case of gases, less than 3 percent relative humidity is desirable and in the case of liquids, it is preferable that less than 1 percent by weight water be present.

After the article is formed, it is heated in an anhydrous gas selected from the group consisting of inert gases, nitrogen, ammonia and mixtures thereof to a temperature above the melting temperature of the bonding compound for a time sufficient to fuse at least some of the bonding compound to the structural fibers and for a time insufficient to destroy the structural fibers. When reference is made to fusing the structural fibers to each other, it is understood that bonding compound, prior to conversion to boron nitride, is melted between separate fibers with or without some softening or melting of structural fibers thus securing the fibers together by mechanical or chemical bonds. It is therefore apparent that in the preferred embodiment, the compound and fiber should be of different materials and that the compound should have a lower melting temperature than the melting or decomposition temperature of the fiber.

When the compound is boron oxide and the structural fibers are boron nitride or partially nitrided boron oxide fibers, the heating temperature is from about 460 to about 1,400° C. Desirably, in that case, the heating temperature is below about 750° C. since higher temperatures tend to result in localized rather than uniform fusion of the fibers to each other by boron oxide throughout the article, particularly when heat transfer is not substantially enhanced by the flow of heated gas through the article.

When the compound is boric acid and the structural fibers are boron oxide fibers, the heating temperature is from about 160° to about 460° C. The heating temperature is desirably from about 200° to about 450° C. since higher temperatures tend to result in localized rather than uniform fusion of the structural fibers to each other by boric acid throughout the article, particularly when heat transfer is not substantially enhanced by flow of heated gas through the article. In addition, at temperatures near 460° C., some localized melting of boron oxide fibers may occur. Lower temperatures increase processing time.

In general, the time required to fuse the structural fibers together without destroying the fibers by melting or decomposition, is dependent upon the fusion temperature used and heat transfer methods employed. At higher temperatures, short heating times are required and rapid heat transfer throughout the article is needed to prevent localized evaporation of $B_2O_3$ or boric acid before the structural fibers throughout the article are fused to each other. Such heat transfer is generally accomplished by rapidly circulating heated gas through the fibers. At higher temperatures, i.e., in the case of boron oxide bonding compound and boron nitride structural fibers at from about 750° C. to about 1400° C., the time sufficient to fuse at least some of the boron oxide to boron nitride structural fibers is generally between about 3 and about 30 minutes. In the case of boric acid compound in boron oxide structural fibers, at from about 400° C. to 460° C., the time sufficient to fuse at least some of the boric acid to the boron oxide structural fibers is again, generally between about 3 and about 30 minutes at high gas flow.

In general, it has been found that a slow temperature rise through the desired peak temperature over the heating time results in a more uniform article.

At lower temperatures; i.e., from about 160° C. to about 200° C., in the case of boric acid compound, and from about 450° C. to about 750° C. in the case of particulate or fiberous boron oxide bonding compound; longer heating times are required for sufficient fusion of the bonding compound to the structural fibers. Even at the lower temperatures, good heat transfer between the fibers is desirable to obtain a uniform article.

At the lower fusion temperatures above discussed with respect to boric acid bonding compound, the sufficient time to fuse the structural fibers is generally between about 30 minutes and 3 hours and in the case of boron oxide bonding compound, the sufficient time to fuse the fibers is generally between about 1 and 6 hours. Again, it has been found that a more uniform article is obtained when the heating temperature is slowly elevated to the peak temperature over the heating time.

The heating of the article in an ammonia atmosphere to a sufficient temperature and for a sufficient time to convert boric acid and boron oxide to boron nitride may occur simultaneously with or subsequent to the heating of the article in an anhydrous gas to fuse the compound to the fibers.

In general, the sufficient temperature to convert the boric acid and boron oxide fibers to boron nitride in an ammonia atmosphere is any temperature above the reaction temperature of ammonia with boron oxide up to the decomposition temperature of boron nitride. In general, the sufficient temperature to convert the boron oxide and boric acid to boron nitride is from about 200° C. to about 900° C. During the melting and conversion step, it is believed that boric acid first converts to boron oxide which then converts to boron nitride during the conversion step and when boron oxide or partially nitrided boron oxide fibers are used, they are converted to boron nitride during the conversion step.

The time which is required to convert boron oxide or boric acid to boron nitride depends mainly upon the diffusion rate of ammonia into boron oxide which in turn is dependent upon the concentration of ammonia gas and the flow or contact of the ammonia gas with the boron oxide and to some extent, the gas temperature. In general, the sufficient time to convert boron oxide at temperatures between about 200° C. and about 900° C. in ammonia gas at atmospheric pressure with sufficient flow of ammonia through the fibers to provide excess ammonia gas reactant, is from about 2 to about 24 hours. Longer times may be used without detriment to the article but have not been found to be necessary.

When boric acid is not used as the bonding compound, the sufficient time to convert the boron oxide to boron nitride at between about 200° C. and about 900° C., has been found to be from about 2 to about 18 hours.

The steps of the process for forming the boron nitride fiber article in accordance with the present invention are illustrated in FIG. 1.

The resulting article comprises boron nitride fibers bonded together with from about 5 to about 70 percent by weight of article of boron nitride bonds formed from converted bonding compound. Essentially all bonds have smooth non-porous surfaces. In addition, when the resulting article comprises boron nitride fibers bonded together with from about 5 to 30 percent by weight of the article of boron nitride bonds formed from fused bonding compound, bonds between crossed fibers are discrete boron nitride bonds which have an average maximum dimension of less than about ten times the diameter of the average diameter of the fiber. Such an article is flexible when compared with a prior art boron nitride fiber article having similar dimensions and having a similar quantity of bonding compound which prior art article is made using a solvent for the bonding compound.

The following examples serve to illustrate the process and article of the invention without limiting the invention.

EXAMPLE 1

7 grams of boron nitride BN structural fibers having an average diameter of about $4\mu$ and an average length of between about 0.5 to about 0.9 centimeter are blended with 3 grams of $B_2O_3$ bonding compound in the form of fibers having an average diameter of about $4\mu$ and an average length of between about 1 and about 2 centimeters. The blending is accomplished by covering a mixture of the fibers with kerosene and blending the resulting composition in a food blender at about 3,200 rpm for about two minutes.

The composition is then cast into a sheet in a mold about 4 centimeters square and dried and heated up to 650° C. over a four hour period in an oven. The resulting sheet is then allowed to cool for eight hours in the oven which is nitrogen purged.

Figure 2:
FIG. 2 is an SEM (scanning electron microscope) photomicrograph, originally at 140 power, of a boron nitride fiber sheet of the invention which contains about 30 weight percent bonding compound and is made using a fluid vehicle which is a solvent for neither the structural fiber or bonding compound.

The sheet is then removed, cut in half and heated in an oven, at a temperature rise of 100° C. per hour up to 900° C., in ammonia at atmospheric pressure. Ammonia flow through the oven is 15 liters per minute. The resulting sheet is flexible, porous, strong and is able to withstand a molten lithium chloride environment for an extended time period without deterioration. FIG. 2 shows an SEM photomicrograph of a sheet made substantially in accordance with this example.

EXAMPLE 2

Figure 3:
FIG. 3 is an SEM photomicrograph, at 140 power, of a boron nitride fiber sheet containing about 30 weight percent bonding compound which sheet is made using water as a solvent for the bonding compound in accordance with the prior art.

Example 1 is repeated except the bonding compound is boric acid crystals and water solvent is used in accordance with the prior art, rather than a fluid vehicle in accordance with the present invention. FIG. 3 shows an SEM photomicrograph of a sheet made substantially in accordance with this Example.

A comparison of FIGS. 2 and 3 clearly shows that the bonds between the fibers of the sheet made according to the present invention (FIG. 2) are smooth, discrete, appear solid and have a maximum average dimension of up to ten times the diameter of the boron nitride fiber; whereas, most of the bonds of the sheet made using water solvent according to the prior art (FIG. 3) have rough uneven surfaces and appear porous and weak.

EXAMPLE 3

Figure 4:
FIG. 4 is an SEM photomicrograph, at 140 power, of a boron nitride fiber sheet of the invention which contains about 50 weight percent bonding compound.

Example 1 is repeated except 5 grams of BN fiber and 5 grams of $B_2O_3$ fiber are used. The resulting sheet is less flexible and less porous than the article prepared according to Example 1 and is strong and able to withstand a molten lithium chloride environment for an extended period without deterioration. FIG. 4 shows an SEM photomicrograph of a sheet made substantially in accordance with this Example. As can be seen, the bonds have smooth surfaces and appear solid.

EXAMPLE 4

Figure 5:
FIG. 5 is an SEM photomicrograph, at 140 power, of a boron nitride fiber sheet which contains about 50 weight percent bonding compound and which used water as a solvent for the bonding compound.

Example 2 is repeated except 5 grams of BN fiber and 5 grams of boric acid in a water solvent are used. The results are the same as Example 2 except the sheet is less strong and even less flexible than the sheet prepared in accordance with Example 3. FIG. 5 shows an SEM photomicrograph of a sheet made substantially in accordance with this Example. As can be seen, the bonds have rough surfaces and appear weakened by cracks and openings.

EXAMPLE 5

Figure 6:
FIG. 6 is an SEM photomicrograph, at 140 power, of a boron nitride fiber sheet of the invention which contains about 8 weight percent bonding compound.

The procedure of Example 1 is followed except 0.8 grams of BN fiber and 9.2 grams of $B_2O_3$ fiber are used and after heating in ammonia, the resulting sheet is heated in air at 600° C. for 2 hours. The resulting sheet has all of the desirable properties of the sheet prepared in Example 1 and in addition is more flexible and more uniform. FIG. 6 shows an SEM photomicrograph of a sheet made substantially in accordance with this Example. As can be seen in FIG. 6, the bonds appear to be discrete and smooth with an average maximum dimension of less than 10 times the fiber diameter.

EXAMPLE 6

Figure 7:
FIG. 7 is an SEM photomicrograph, at 140 power, of a boron nitride fiber sheet which contains about 8 weight percent bonding compound and which used water as a solvent for the bonding compound.

Example 5 is repeated except that 0.8 grams of boric acid is used as the bonding compound and water solvent is used in accordance with the prior art, rather than a fluid vehicle which is a non-solvent in accordance with the present invention. The resulting sheet is much less flexible, less strong and seems less porous than the sheet of Example 5. FIG. 7 shows an SEM photomicrograph of a sheet made substantially in accordance with this Example.

A comparison of FIGS. 6 and 7 clearly shows that bonds between the fibers of the sheet made according to the present invention (FIG. 6) are smooth, discrete, appear solid and have a maximum average dimension of up to ten times the diameter of the fiber; whereas, the bonds of the sheet using water solvent according to the prior art (FIG. 7) are not discrete but appear agglomerated in sizes far in excess of ten times the fiber diameter.

EXAMPLE 7

The procedure of Example 5 is followed except partially nitrided $B_2O_3$ fibers are substituted for the BN fibers. The partially nitrided $B_2O_3$ fibers are prepared in accordance with the teachings of Example 2 of U.S. Pat. No. 3,668,059 wherein boron oxide fibers are heated in flowing ammonia gas at 210° C. for 0.5 hours, from 210° C. to 550° C. at a rate of 4° C. per hour, from 550° C. to 640° C. at a rate of 15° C. per hour, and then at 640° C. for one hour. The resulting product is a strong BN bonded BN fiber paper which is resistant to molten lithium chloride.

EXAMPLE 8

1 gram of $B_2O_3$ was slurried into water for five minutes and four grams of BN fiber were added. The slurry was blended for an additional two minutes. The resulting fiber slurry was cast upon 4" diameter filter paper in a Buchner funnel to form a sheet. The cast sheet was sandwiched between two stainless steel plates and heated at 100° C. per hour up to 600° C. The resulting fiber mat showed little or no fiber bonding and the mat had no integrity. Water is a solvent for $B_2O_3$.

EXAMPLE 9

Example 8 was repeated except methanol was substituted for the water. Again the resulting mat showed little or no fiber bonding and the mat had no integrity. Methanol appears to dissolve some of the $B_2O_3$.

EXAMPLE 10

Example 8 was repeated except acetone was used as the liquid. The resulting mat showed very little fiber bonding and the mat had very little integrity. Acetone seems to dissolve some $B_2O_3$.

EXAMPLE 11

Example 8 was repeated except propanol, a non-solvent for $B_2O_3$ (i.e., a liquid which does not dissolve $B_2O_3$) was used. The resulting sheet showed good fiber bonding.

EXAMPLE 12

Example 8 was repeated except kerosene, a non-solvent for $B_2O_3$, was used as the liquid. The resulting sheet showed good fiber bonding.

EXAMPLE 13

Example 8 was repeated except benzene, a non-solvent for $B_2O_3$, was used as the liquid. The resulting sheet showed good fiber bonding.

EXAMPLE 14

Example 8 was repeated except a liquid fluorinated hydrocarbon, a non-solvent for $B_2O_3$, was used as the liquid. The resulting sheet showed good fiber bonding.

EXAMPLE 15

Boron nitride fiber mat samples were prepared essentially in accordance with the teachings of U.S. Pat. No. 3,837,997 using boric acid and boron nitride fibers slurried in water. A 3 mm thick mat prepared in accordance with Example 1 of the patent was brittle and fractured into small pieces when bent around a rod having a 1.5 cm. diameter and a 3 mm thick mat prepared in accordance with Example 2 of the patent partially disintegrated when bent around a rod having a 1.5 cm diameter. 3 mm thick mat samples prepared in accordance with Example 1. of the present application show no apparent cracking or deterioration when bent around a 1.5 cm. diameter rod and samples prepared in accordance with the present invention using comparable quantities of bonding compound have greater porosity than samples prepared substantially in accordance with Examples 1 and 2 of U.S. Pat. No. 3,837,997.

What is claimed is:

1. A method for manufacturing a boron nitride article comprising:

(a) blending from about 0.5 to about 40 weight percent of a bonding compound selected from the group consisting of boron oxide, boric acid and mixtures thereof with from about 60 to about 99.5 weight percent of structural fiber manufactured from boron oxide, partially nitrided boron oxide, boron nitride or mixtures of such fibers in an anhydrous fluid vehicle in which the bonding compound and the structural fiber are insoluble, the bonding compound having a lower melting temperature than the melting or decomposition temperature of the structural fiber;

(b) forming a shaped article with the resulting blend and removing sufficient fluid vehicle to permit intimate contact of the structural fiber with the bonding compound;

(c) heating the shaped article in an anhydrous gas selected from the group consisting of inert gases, nitrogen, ammonia, carbon dioxide and mixtures thereof to a temperature above the melting temperature of the bonding compound and below the melting or decomposition temperature of the structural fiber for a time sufficient to melt at least some of the bonding compound to the structural fibers; and (d) heating the shaped article in an ammonia atmosphere to a sufficient temperature and for a sufficient time to convert the bonding compound and structural fibers to boron nitride.

2. The method claimed in claim 1 wherein the fluid vehicle is a liquid selected from the group consisting of hydrocarbons and mono hydroxy alcohols having three or more carbon atoms.

3. The method of claim 1 wherein from about 0.5 kilograms per square centimeter to about 2.5 kilograms per square centimeter of absolute pressure is applied to said shaped article during said heating to melt the bonding compound.

4. The method of claim 1 wherein the shaped article is a porous fiber mat.

5. The method claimed in claim 2 wherein the fluid vehicle is kerosene which is removed by evaporation.

6. The method of claim 1 wherein the structural fiber comprises boron nitride or partially nitrided boron oxide.

7. The method of claim 6 wherein the bonding compound is boron oxide in particulate form.

8. The method claimed in claim 6 wherein the heating to melt the boron oxide bonding compound and the heating to convert the boron oxide bonding compound and the structural fibers to boron nitride are done sequentially in an ammonia atmosphere.

9. The method of claim 6 wherein the shaped article is a fiber mat.

10. The method of claim 6 wherein from about 0.5 kilograms per square centimeter to about 2.5 kilograms per square centimeter of absolute pressure is applied to said shaped article during said heating.

11. The method of claim 6 wherein the fluid vehicle is selected from the group consisting of hydrocarbons and monohydroxy alcohols having three or more carbon atoms.

12. The method of claim 1 wherein from about 5 to about 20 weight percent of boron oxide fiber bonding compound is blended with from about 80 to about 95 weight percent of boron nitride structural fiber.

13. The method of claim 12 wherein the boron oxide bonding compound is in particulate form.

14. The method claimed of claim 12 wherein from about 80 to about 90 weight percent boron nitride structural fiber is blended with from about 10 to about 20 weight percent of boron oxide bonding compound.

15. The method claimed in claim 12 wherein the fluid vehicle is a liquid selected from the group consisting of hydrocarbons and monohydroxy alcohols having three or more carbon atoms.

16. The method claimed in claim 15 wherein the structural fibers are blended with boron oxide bonding compound in the fluid vehicle.

17. The method claimed in claim 12 wherein the structural fibers and boron oxide bonding compound are blended by blowing them randomly into a container with anhydrous gas.

18. The method claimed in claim 12 wherein the structural fibers and boron oxide bonding compound are blended by mixing them in a fluidized bed in which the fluid vehicle is either gas or liquid.

19. The method of claim 12 wherein said shaped article is pressed between plates at from about 0.5 kilograms per square centimeter to about 2.5 kilograms per square centimeter of gauge pressure during said heating to melt the bonding compound.

20. The method of claim 12 wherein the shaped article is a fiber mat.

21. The method of claim 12 wherein said article is heated to between about 460° C. and about 1400° C. for from about three minutes to about six hours to melt the boron oxide bonding compound and said gas is an inert gas or nitrogen.

22. The method of claim 12 wherein the sufficient temperature to convert boron oxide to boron nitride is from about 200° to about 900° C. and the sufficient conversion time is from about 2 to about 18 hours.

23. An article having sufficient flexibility that samples 3 mm thick show no apparent cracking or deterioration when bent around a 1.5 cm diameter rod; said article comprising boron nitride fibers bonded together with from about 5 to 30 percent by weight of article of discrete boron nitride bonds, said discrete bonds between crossed fibers having an average maximum dimension of up to ten times the diameter of the boron nitride fiber and essentially all of said bonds having smooth non-porous surfaces.

24. An article having sufficient flexibility that samples 3 mm thick show no apparent cracking or deterioration when bent around a 1.5 cm diameter rod; said article comprising boron nitride fibers bonded together with from about 25 to about 70 percent by weight of article of boron nitride bonds, essentially all of said bonds having smooth non-porous surfaces.

25. The article of claim 23 wherein the article is a fiber mat.

26. An electric cell incorporating molten lithium chloride and the fiber mat of claim 25 as a cell separator.

27. The article of claim 24 wherein the article is a fiber mat.

28. An electric cell incorporating molten lithium chloride and the fiber mat of claim 27 as a cell separator.

* * * * *